United States Patent
Park et al.

(10) Patent No.: US 9,442,223 B2
(45) Date of Patent: *Sep. 13, 2016

(54) POLARIZING PLATE AND IMAGE DISPLAY DEVICE COMPRISING SAME

(71) Applicant: LG CHEM, LTD., Seoul (KR)

(72) Inventors: Kwang-Seung Park, Daejeon (KR); Mi-Rin Lee, Daejeon (KR); Jun-Wuk Park, Daejeon (KR); Eun-Soo Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/765,785

(22) PCT Filed: Sep. 19, 2014

(86) PCT No.: PCT/KR2014/008724
§ 371 (c)(1),
(2) Date: Aug. 4, 2015

(87) PCT Pub. No.: WO2015/046815
PCT Pub. Date: Apr. 2, 2015

(65) Prior Publication Data
US 2015/0378063 A1    Dec. 31, 2015

(30) Foreign Application Priority Data

Sep. 30, 2013 (KR) .......... 10-2013-0116991
Sep. 12, 2014 (KR) .......... 10-2014-0121321

(51) Int. Cl.
C09K 19/00    (2006.01)
G02B 1/14    (2015.01)
G02B 5/30    (2006.01)

(52) U.S. Cl.
CPC ............... *G02B 1/14* (2015.01); *G02B 5/3033* (2013.01); *Y10T 428/10* (2015.01); *Y10T 428/105* (2015.01); *Y10T 428/1036* (2015.01); *Y10T 428/1041* (2015.01)

(58) Field of Classification Search
CPC ............ G02B 1/04; G02B 1/08; G02B 1/10; G02B 1/105; G02B 1/14; G02B 5/30; G02B 5/3025; G02B 5/3033; G02B 5/305; C09J 133/14; Y10T 428/10; Y10T 428/1036; Y10T 428/1041; Y10T 428/105
USPC ........ 428/1.1, 1.3, 1.31, 1.33, 336, 1.5, 523; 359/507; 522/28, 64
See application file for complete search history.

(56) References Cited

FOREIGN PATENT DOCUMENTS

| EP | 2840124 | * | 2/2015 | |
|---|---|---|---|---|
| JP | 2005010329 A | | 1/2005 | |
| JP | 2005092112 A | | 4/2005 | |
| KR | 1020020096349 A | | 12/2002 | |
| KR | 1020100138902 A | | 12/2010 | |
| KR | 1020110109215 A | | 10/2011 | |
| KR | WO 2014204142 A1 | * | 12/2014 | ............... C09J 4/00 |

\* cited by examiner

Primary Examiner — Ruiyun Zhang
(74) Attorney, Agent, or Firm — Dentons US LLP

(57) ABSTRACT

The present invention relates to a polarizing plate including a polarizer; and a protective layer formed on at least one surface of the polarizer, in which the protective layer is a cured product of a radical curable composition including (A) a first compound represented by [Formula 1], (B) a radical curable second compound having two or more of each of a benzene ring, a (meth)acryloyl group, and a carboxy group in a molecule thereof, and (C) a radical initiator, and an image display device including the same.

20 Claims, No Drawings

POLARIZING PLATE AND IMAGE DISPLAY DEVICE COMPRISING SAME

This application is a National Stage Application of International Application No. PCT/KR2014/008724, filed Sep. 19, 2014, and claims the benefit of Korean Application No. 10-2013-0116991, filed Sep. 30, 2013, and Korean Application No. 10-2014-0121321, filed Sep. 12, 2014, all of which are hereby incorporated by reference in their entirety for all purposes as if fully set forth herein.

TECHNICAL FIELD

The present invention relates to a polarizing plate and an image display device including the same, and more specifically, to a polarizing plate which has excellent adhesion between a polarizer and a protective layer, is excellent in water resistance and heat resistance, and may be manufactured as a thin-type, and an image display device including the same.

BACKGROUND ART

A polarizing plate has been usually used in a structure, in which a protective film is stacked on both surfaces of a polarizer formed of a polyvinyl alcohol (hereinafter, referred to as 'PVA')-based resin dyed with a dichroic dye or iodine. In this case, a triacetyl cellulose (TAC)-based film has been frequently used as the protective film because the film is excellent in optical transparency or moisture permeability.

Meanwhile, as a liquid crystal display device has recently been developed into a mobile device such as a laptop personal computer, a cellular phone and a car navigation system, it is required that a polarizing plate which constitutes a liquid crystal display device is thin and light weight. However, in a polarizing plate in which a TAC film and the like are laminated as the protective film as described above, it is difficult to maintain a thickness of the protective film at 20 μm or less from the viewpoint of handling property or durability performance during the operation, so that there is a limitation for the liquid crystal device to be thin and light weight.

In order to solve the aforementioned problems, a technology has been suggested, in which a protective film is provided on only one surface of a polarizer, and a transparent thin film layer is formed by coating an active energy ray curable composition on the other surface thereof. Meanwhile, the active energy ray curable composition which has been suggested may be classified into a radical curable composition and a cationic curable composition according to the curing method. In this case, when a transparent thin film layer is formed using a cationic curable composition, there is an advantage in that excellent adhesion with the polarizer is achieved, but there are many disadvantages in the manufacturing process due to a slow curing rate and a low degree of curing.

In order to solve such problems of the cationic curable composition, a technology has been suggested, in which a transparent thin film layer is formed by using a radical curable composition which includes an acrylic compound as a main component. However, in the case of a radical curable composition including an acrylic compound as a main component, there are problems in that the curing rate is fast compared to a cationic curable composition, while the glass transition temperature of a protective layer after curing of the radical is low, such that heat resistance reliability of a polarizing plate to be manufactured using the same is not good.

In order to solve the problem, there has been suggested a technology of additionally adding a hydrophilic and monofunctional monomer to a radical curable composition and using the monomer in mixture with the acrylic compound in order to increase the glass transition temperature of the radical curable composition. However, when these are additionally added, the glass transition temperature of the radical curable composition may be increased, but since there is an aspect in which water resistance which a polarizing plate needs to basically have becomes considerably reduced, the addition of these compounds has been fatally disadvantageous in application to the polarizing plate.

Accordingly, there is a need for a new polarizing plate which is excellent in water resistance and heat resistance while having a protective layer which may be formed by radical curing.

DISCLOSURE

Technical Problem

The present invention has been made in an effort to solve the aforementioned problem and provide a polarizing plate, which has excellent adhesion between a polarizer and a protective layer and is excellent in water resistance and heat resistance, and may be manufactured as a thin-type, and an image display device including the same.

Technical Solution

In one aspect, the present invention provides a polarizing plate including a polarizer, and a protective layer formed on at least one surface of the polarizer, in which the protective layer is a cured product of a radical curable composition including (A) a first compound represented by the following [Formula 1], (B) a radical curable second compound having two or more of each of a benzene ring, a (meth)acryloyl group, and a carboxyl group in a molecule thereof, and (C) a radical initiator.

[Formula I]

In [Formula I], $R_1$ is an ester group or an ether group; $R_2$ is a $C_{1-10}$ alkyl group, a $C_{4-10}$ cycloalkyl group, or a combination thereof, and in this case, $R_2$ has at least one hydroxy substituent in a molecule thereof; and $R_3$ is hydrogen, or a substituted or unsubstituted $C_{1-10}$ alkyl group.

Meanwhile, the second compound is preferably a compound represented by the following [Formula II].

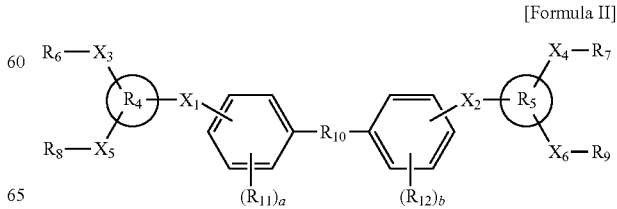

[Formula II]

In [Formula II], $R_4$ and $R_5$ are each independently a $C_{1\sim10}$ aliphatic chain, a $C_{4\sim14}$ aliphatic ring, a $C_{6\sim14}$ aromatic ring, or a combination thereof; $R_6$ and $R_7$ are each independently a $C_{1\sim14}$ alkyl group, a $C_{4\sim14}$ cycloalkyl group, a $C_{6\sim14}$ aryl group, or a combination thereof, and in this case, $R_6$ and $R_7$ each independently have at least one carboxy substituent in a molecule thereof; $R_8$ and $R_9$ are each independently an acryloyl group or a methacryloyl group; $R_{10}$ is a single bond, or a $C_{1\sim10}$ alkylene group; $R_{11}$ and $R_{12}$ are each independently a halogen atom, or a $C_{1\sim10}$ alkyl group; a and b are each independently an integer of 0 to 2; $X_1$ and $X_2$ are each independently a single bond, or —O—; $X_3$ and $X_4$ are each independently a single bond, —O—, —CO—, —COO—, or —OCO—; and $X_5$ and $X_6$ are each independently a single bond or —O—.

Meanwhile, it is preferred that the radical curable composition includes 10 to 80 parts by weight of the first compound, 1 to 80 parts by weight of the second compound and 0.5 to 10 parts by weight of the radical initiator, based on 100 parts by weight of the radical curable composition.

Meanwhile, the first compound may be one or more compounds selected from the group consisting of compounds represented by the following [Formula 1] to [Formula 10].

[Formula 1]
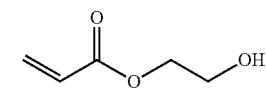

[Formula 2]
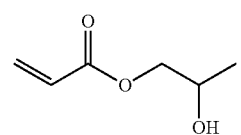

[Formula 3]
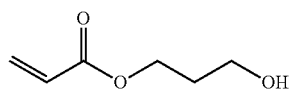

[Formula 4]
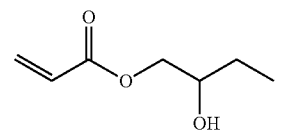

[Formula 5]
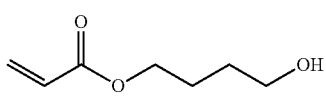

[Formula 6]
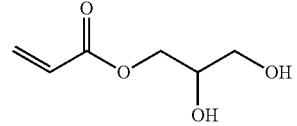

[Formula 7]
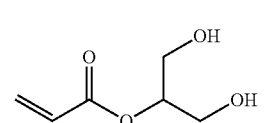

[Formula 8]
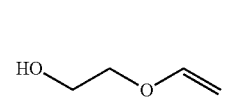

[Formula 9]
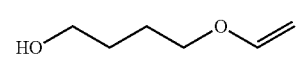

[Formula 10]
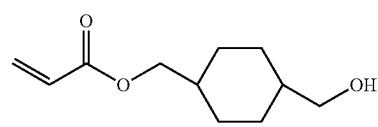

Further, the second compound may be one or more compounds selected from the group consisting of compounds represented by the following [Formula 11] and [Formula 12].

[Formula 11]
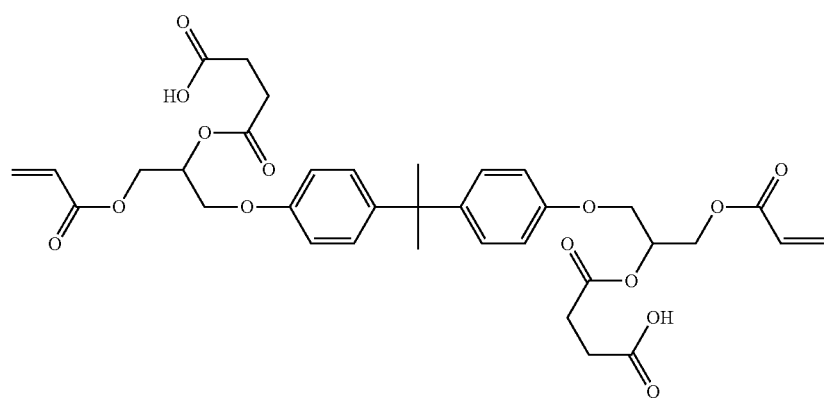

-continued

[Formula 12]

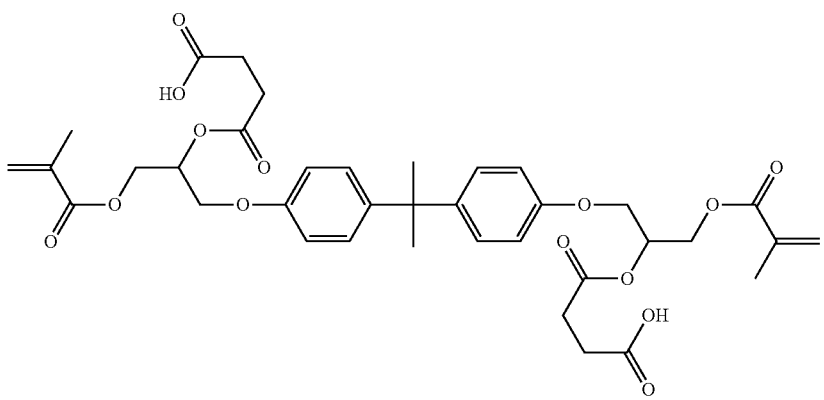

Meanwhile, it is preferred that the second compound has an acid value of 50 to 300 mg KOH/g.

Meanwhile, it is preferred that the radical curable composition further includes a photoacid generator.

In this case, it is preferred that the content of the photoacid generator is 0.5 to 10 parts by weight based on 100 parts by weight of the radical curable composition.

Meanwhile, it is preferred that the radical curable composition after curing has a glass transition temperature of 60° C. or more.

Meanwhile, it is preferred that the protective layer has a thickness of 0.5 to 20 μm.

Meanwhile, in the polarizing plate of the present invention, a protective film may be further attached to a surface opposite to a surface of the polarizer, on which a protective layer is formed, through an adhesive layer.

Furthermore, the polarizing plate of the present invention may further include an adhesion layer at the upper portion of the protective layer.

Meanwhile, it is preferred that the polarizer is a polyvinyl alcohol-based film including iodine or a dichroic dye.

In another aspect, the present invention provides an image display device including the polarizing plate.

Advantageous Effects

The polarizing plate of the present invention has excellent adhesion between a polarizer and a protective layer, is excellent in water resistance such that discoloration of the polarizer does not occur even under a high humidity environment, has a high glass transition temperature after curing of a radical curable composition for forming a protective layer, and thus is excellent in heat resistance.

Further, the polarizing plate of the present invention has a protective layer having a small thickness as compared to a polarizing plate having a transparent protective film in the related art, and thus may be manufactured as a thin-type.

MODE FOR INVENTION

Hereinafter, preferred exemplary embodiments of the present invention will be described. However, the exemplary embodiments of the present invention may be modified in various forms, and the scope of the present invention is not limited to the exemplary embodiments which will be described below. Further, exemplary embodiments of the present invention are provided to more completely explain the present invention to a person with ordinary skill in the art.

1. Polarizing Plate

As a result of repeated studies, the present inventors have found that when a radical curable compound having two or more of each of a benzene ring, a (meth)acryloyl group and a carboxyl group in a molecule thereof is used in mixture with an acrylic compound having a hydroxy group, and the like in a radical curable composition for forming a protective layer, water resistance and heat resistance are very excellent, thereby completing the present invention.

More specifically, the present invention is a polarizing plate including a polarizer, and a protective layer formed on at least one surface of the polarizer, in which the protective layer is a cured product of a radical curable composition including (A) a first compound represented by the following [Formula 1], (B) a radical curable second compound having two or more of each of a benzene ring, a (meth)acryloyl group, and a carboxyl group in a molecule thereof, and (C) a radical initiator.

[Formula I]

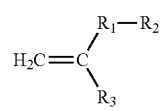

In [Formula I], $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

1-1. Polarizer

First, as the polarizer of the present invention, it is possible to use a polarizer well known in the art, for example, a film composed of polyvinyl alcohol (PVA) including iodine or a dichroic dye. The polarizer may be manufactured by dyeing iodine or a dichromatic dye to the PVA film, but the manufacturing method thereof is not particularly limited. In the present specification, the polarizer refers to a state in which the polarizer does not include a protective layer (or a protective film), and the polarizing plate refers to a state in which the polarizing plate includes a polarizer and a protective layer (or a protective film).

Meanwhile, when the polarizer is a polyvinyl alcohol-based film, the polyvinyl alcohol-based film may be used without particular limitation as long as the film includes a polyvinyl alcohol resin or a derivative thereof. In this case, examples of the derivative of the polyvinyl alcohol resin include, but are not limited to, a polyvinyl formal resin, a polyvinyl acetal resin and the like. Also, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., and M3000 and M6000 manufactured by Nippon Synthetic Chemical Industry Co., Ltd., and the like.

Meanwhile, the degree of polymerization of the polyvinyl alcohol-based film may be in a range of 1,000 to 10,000, preferably, in a range of 1,500 to 5,000, but is not limited thereto. This is because when the degree of polymerization satisfies the range, molecules freely move, and may be flexibly mixed with iodine or a dichroic dye, and the like.

1-2. Protective Layer

Next, the protective layer of the present invention is formed by using the radical curable composition in order to support and protect a polarizer, and may be formed by a method well known in the art. For example, the protective layer may be formed by a method of applying the radical curable composition on one surface of a polarizer to form a protective layer by a coating method well known in the art, for example, a method such as spin coating, bar coating, roll coating, gravure coating and blade coating, and then curing the protective layer through irradiation of an active energy ray such as UV-ray, visible light and electron beam, and X-ray. In this case, the irradiation method is not particularly limited, and for example, may be performed by irradiating UV light at 10 to about 2,500 mJ/cm$^2$ using a UV light irradiation device (fusion lamp, D bulb).

In this case, the radical curable composition of the present invention may more preferably include 40 to 89 parts by weight of the first compound, 1 to 80 parts by weight of the second compound and 0.5 to 10 parts by weight of the radical initiator, based on 100 parts by weight of the radical curable composition.

A. First Compound

First, the first compound included in the radical curable composition according to the present invention is a component for implementing adhesion between a polarizer and a protective layer using a hydrogen bond by a hydroxy group, and various compounds represented by [Formula 1] may be used.

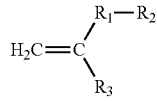

[Formula I]

In [Formula I], $R_1$ is an ester group or an ether group; $R_2$ is a $C_{1~10}$ alkyl group, a $C_{4~10}$ cycloalkyl group, or a combination thereof, and in this case, $R_2$ has at least one hydroxy substituent in a molecule thereof; and $R_3$ is hydrogen, or a substituted or unsubstituted $C_{1~10}$ alkyl group.

In this case, in $R_2$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

Furthermore, in $R_2$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclohexane ring and the like.

Meanwhile, the hydroxy group may be substituted at any position in an alkyl group or a cycloalkyl group. For example, the hydroxy group may be present at a terminal of an alkyl group, or at the middle of an alkyl group. Meanwhile, the other hydrogen atoms included in the alkyl group or the cycloalkyl group may be substituted with any substituent.

Further, in $R_3$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent.

For example, in the present invention, the first compound may be, but is not limited to, one or more compounds selected from compounds represented by the following [Formula 1] to [Formula 10].

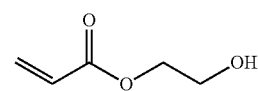

[Formula 1]

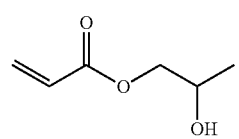

[Formula 2]

[Formula 3]

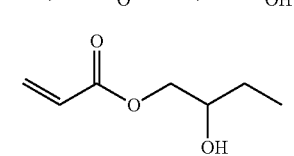

[Formula 4]

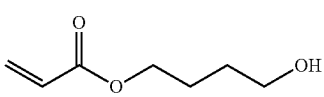

[Formula 5]

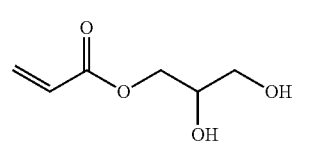

[Formula 6]

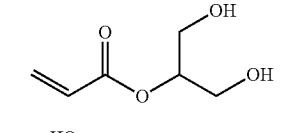

[Formula 7]

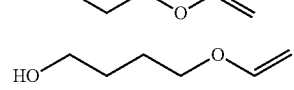

[Formula 8]

[Formula 9]

[Formula 10]

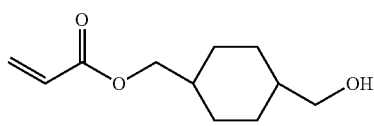

Meanwhile, the content of the first compound may be in a range of 1 to 80 parts by weight, preferably 20 to 75 parts by weight, and more preferably 30 to 65 parts by weight, based on 100 parts by weight of the entire radical curable composition. This is because when the content of the first compound is too low, it is difficult to secure adhesion, and when the content thereof is too high, the glass transition temperature of the radical curable composition is decreased, thereby leading to deterioration in heat resistance.

B. Second Compound

Next, the second compound included in the radical curable composition according to the present invention is a component for imparting water resistance to a protective layer, and furthermore increasing the glass transition temperature of the composition to impart heat resistance to the protective layer, and it is possible to use various radical curable compounds having two or more of each of a benzene ring, a (meth)acryloyl group and a carboxy group in a molecule thereof. In this case, the (meth)acryloyl group refers to an acryloyl group or a methacryloyl group.

Specifically, the second compound of the present invention enhances adhesion by removing moisture which prevents a hydroxy group of the first compound from implementing adhesion through a hydrogen bond with the polarizer, and further, the protective layer becomes dense and hard due to a benzene ring-containing moiety which has a high molecular density in a molecule thereof, and makes it difficult for moisture to pass through the protective layer, thereby increasing water resistance. In addition, due to the benzene ring-containing moiety which has a high molecular density in a molecule thereof, the second compound itself has a high glass transition temperature, and a carboxy group present in a molecule thereof forms a hydrogen bond with a hydroxy group of the first compound to make the protective layer hard, thereby increasing the glass transition temperature of the protective layer.

Meanwhile, in the present invention, the second compound is not limited to, but is preferably a compound represented by the following [Formula II]. In this case, particularly excellent water resistance and heat resistance may be secured.

[Formula II]

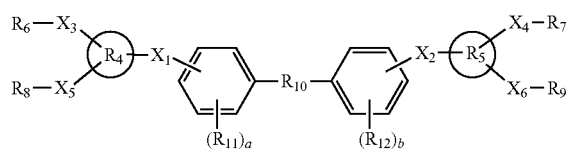

In [Formula II], $R_4$ and $R_5$ are each independently a $C_{1\sim10}$ aliphatic chain, a $C_{4\sim14}$ aliphatic ring, a $C_{6\sim14}$ aromatic ring, or a combination thereof; $R_6$ and $R_7$ are each independently a $C_{1\sim14}$ alkyl group, a $C_{4\sim14}$ cycloalkyl group, a $C_{6\sim14}$ aryl group, or a combination thereof, and in this case, $R_6$ and $R_7$ each independently have at least one carboxy substituent in a molecule thereof; $R_8$ and $R_9$ are each independently an acryloyl group or a methacryloyl group; $R_{10}$ is a single bond, or a $C_{1\sim10}$ alkylene group; $R_{11}$ and $R_{12}$ are each independently a halogen atom, or a $C_{1\sim10}$ alkyl group; a and b are each independently an integer of 0 to 2; $X_1$ and $X_2$ are each independently a single bond, or —O—; $X_3$ and $X_4$ are each independently a single bond, —O—, —CO—, —COO—, or —OCO—; and $X_5$ and $X_6$ are each independently a single bond or —O—.

In this case, in $R_4$ and $R_5$, the aliphatic chain refers to a straight-chained or branch-chained saturated or unsaturated trivalent hydrocarbon moiety having 1 to 10, or 1 to 8, or 1 to 4 carbon atoms, and examples thereof include, but are not limited to, a trivalent alkane chain such as a methane chain, an ethane chain, a propane chain, a butane chain, a pentane chain, a hexane chain, a heptane chain, an octane chain, a nonane chain and a decane chain, and the like. One or more hydrogen atoms included in the aliphatic hydrocarbon chain may be substituted with any substituent.

Furthermore, in $R_4$ and $R_5$, the aliphatic ring refers to a saturated or unsaturated non-aromatic trivalent monocyclic, bicyclic or tricyclic hydrocarbon moiety of 4 to 14, or 4 to 10, or 4 to 6 ring carbons, and examples thereof include, but are not limited to, a trivalent cycloalkane ring such as a cyclopentane ring and a cyclohexane ring, or a trivalent cycloalkene ring such as a cyclopentene ring, a cyclohexene ring and a cyclooctene ring, and the like. One or more hydrogen atoms included in the aliphatic hydrocarbon ring may be substituted with any substituent.

Further, in $R_4$ and $R_5$, the aromatic ring refers to a trivalent monocyclic, bicyclic or tricyclic aromatic hydrocarbon moiety having 6 to 14, or 6 to 12 ring atoms, and examples thereof include, but are not limited to, a trivalent benzene ring, a trivalent naphthalene ring, a trivalent anthracene ring, a trivalent biphenyl ring and the like. One or more hydrogen atoms included in the aromatic hydrocarbon ring may be substituted with any substituent.

Furthermore, in R6 and R7, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

Furthermore, in $R_6$ and $R_7$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclopentene ring, a cyclohexane ring, a cyclohexene group and the like.

Further, in $R_6$ to $R_7$, the aryl group refers to a monocyclic, bicyclic or tricyclic aromatic hydrocarbon moiety having 6 to 14, or 6 to 12 ring atoms, and examples thereof include, but are not limited to, a benzene ring, a naphthalene ring, an anthracene ring, a biphenyl ring and the like.

Meanwhile, the carboxy group may be substituted at any position in an alkyl group, a cycloalkyl group, or an aryl group. For example, the carboxy group may be present at a terminal of an alkyl group, or at the middle of an alkyl group. Meanwhile, the other hydrogen atoms included in the alkyl group, the cycloalkyl group or the aryl group may be substituted with any substituent.

In addition, in $R_{10}$, the alkylene group refers to a straight-chained or branch-chained divalent hydrocarbon moiety having 1 to 10, or 1 to 8, or 1 to 4 carbon atoms, and the alkylene group in the present specification may also include at least one unsaturated bond in a molecule thereof. Meanwhile, examples of the alkylene group include, but are not limited to, methylene, dimethylmethylene, ethylene, trimethylene, tetramethylene, pentamethylene, hexamethylene, heptamethylene, nonamethylene, decamethylene and the like. However, among them, methylene or dimethylmethylene is particularly preferred. One or more hydrogen atoms included in the alkylene group may be substituted with any substituent.

Furthermore, in $R_{11}$ and $R_{12}$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, the second compound may be, but is not limited to, one or more compounds selected from the group consisting of compounds represented by the following [Formula 11] and [Formula 12].

Meanwhile, the acid value of the second compound may be in a range of 50 to 300 mg KOH/g, preferably 50 to 250 mg KOH/g or 100 to 200 mg KOH/g. Here, the acid value refers to the number of mg of KOH required to completely neutralize 1 g of a sample. In this case, the aforementioned excellent water resistance and heat resistance may be effectively secured.

C. Radical Initiator

Next, the radical initiator included in the radical curable composition according to the present invention is for promoting the radical polymerizability to enhance the curing rate, and as the radical initiator, radical initiators generally used in the art may be used without limitation.

More specifically, the radical initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxyl)phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-

[Formula 11]

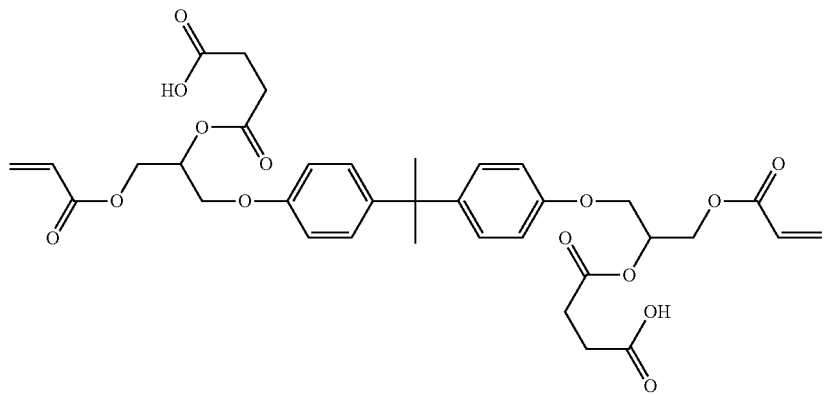

[Formula 12]

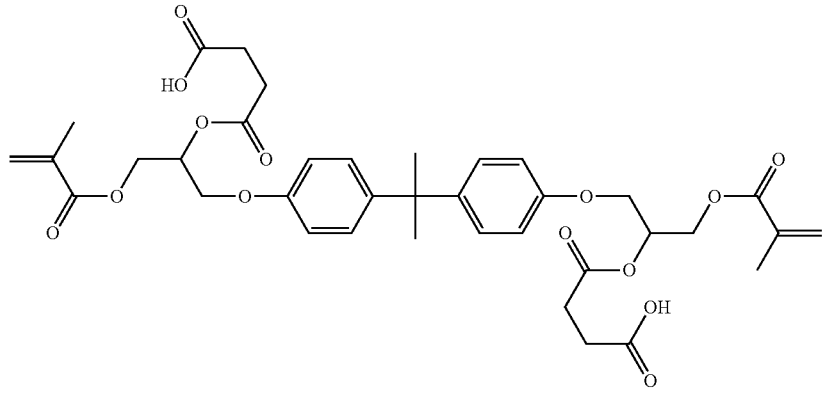

Meanwhile, the content of the second compound may be in a range of 10 to 80 parts by weight, preferably 20 to 75 parts by weight, and more preferably 30 to 65 parts by weight, based on 100 parts by weight of the entire radical curable composition. This is because when the content of the second compound is too low, the glass transition temperature of the composition may be low, and when the content thereof is too high, adhesion may be low.

phosphine oxide, phosphine oxide, and phenylbis(2,4,6-trimethylbenzoyl)-phosphineoxide. Particularly in the present invention, phenylbis(2,4,6-trimethylbenzoyl)-phosphineoxide may be preferably used.

Meanwhile, the content of the radical initiator is preferably, for example, in a range of 0.5 to 10 parts by weight, 1 to 5 parts by weight, or 2 to 3 parts by weight, based on 100 parts by weight of the radical curable composition. This is because the radical curable composition may be smoothly cured when the content of the radical initiator satisfies the numerical range.

D. Photoacid Generator

Meanwhile, the radical curable composition of the present invention may additionally include a photoacid generator, if necessary. The photoacid generator is a compound which generates acid ($H^+$) by an active energy ray, and is advantageous in that when the photoacid generator is additionally included, the acid value of the radical curable composition may be adjusted by the photoacid generator, and accordingly, adhesion may be further enhanced.

The photoacid generator which may be used in the present invention is preferably a photoacid generator which includes, for example, a sulfonium salt or an iodonium salt. Specific examples of the photoacid generator including the sulfonium salt or the iodonium salt include, for example, one or more selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium) dihexafluoroantimonate, and (thiodi-4,1-phenylene)bis(diphenylsulfonium)dihexafluorophosphate, but are not limited thereto.

Meanwhile, the content of the photoacid generator may be, for example, 10 parts by weight or less, preferably 0.5 to 10 parts by weight, 2 to 8 parts by weight, or 3 to 7 parts by weight, based on 100 parts by weight of the radical curable composition. When the photoacid generator is included in a content in the numerical range in the radical curable composition according to the present invention, there is an advantage in that adhesive strength is further enhanced than the case where the photoacid generator is not included or does not satisfy the numerical range.

E. Physical Properties of Radical Curable Composition

Meanwhile, the radical curable composition according to the present invention preferably has a viscosity in a range of 10 to 200 cP or 20 to 100 cP. When the viscosity of the radical curable composition satisfies the numerical range, there is an advantage in that workability is excellent because the protective layer may be thinly formed, and has a low viscosity.

Meanwhile, the glass transition temperature of a protective layer formed using the radical curable composition is preferably 60° C. or more, and may be, for example, 60 to 220° C., 65 to 150° C. or 65 to 120° C. A protective layer manufactured by using the radical curable composition according to the present invention, which has a glass transition temperature in the aforementioned numerical range, is advantageous in that excellent heat resistance and water resistance are achieved.

Meanwhile, the glass transition temperature of the cationic curable composition after curing is preferably 60° C. or more, and may be, for example, 60 to 220° C., 70 to 150° C. or 80 to 120° C. This is because a protective layer formed is very thermally stable, and a polarizing plate including the same is excellent in heat resistance.

Meanwhile, the thickness of a protective layer formed by using the radical curable composition is preferably 0.5 to 20 µm, and may be, for example, 0.5 to 15 µm or 0.5 to 10 µm. This is because a polarizing plate manufactured may become thin and light weight when the thickness of the protective layer satisfies the range. When the thickness is too small, thermal impact stability and curl characteristics of the polarizer are vulnerable, and when the thickness is too large, it is difficult to make the polarizing plate thin and light weight.

1-3. Protective Film

Meanwhile, the polarizing plate of the present invention may further include a protective film on one surface of the polarizer, if necessary. More specifically, when the protective layer is formed on one surface of the polarizer in the polarizing plate of the present invention, a separate protective film may be attached to a surface opposite to the surface, on which a protective layer is formed, through an adhesive layer in order to support and protect the polarizer.

In this case, the protective film is provided for supporting and protecting a polarizer, and it is possible to use protective films formed of various materials generally known in the art, for example, a cellulose-based film, a polyethylene terephthalate (PET) film, a cycloolefin polymer (COP) film, an acrylic film and the like without limitation. Among them, it is particularly preferred that an acrylic film is used in consideration of optical properties, durability, economic efficiency and the like.

Meanwhile, the acrylic film which may be used in the present invention may be obtained by molding a molding material including a (meth)acrylate-based resin as a main component by extrusion molding. In this case, the (meth)acrylate-based resin includes a resin including a (meth)acrylate-based unit as a main component, and is a concept which includes not only a homopolymer resin composed of a (meth)acrylate-based unit but also a copolymer resin in which other monomer units other than the (meth)acrylate-based unit are copolymerized, and a blend resin in which other resins are blended with the aforementioned (meth)acrylate-based resin.

Meanwhile, the (meth)acrylate-based unit may be, for example, an alkyl(meth)acrylate-based unit. Here, the alkyl (meth)acrylate-based unit refers to both an alkyl acrylate-based unit and an alkyl methacrylate-based unit, and the alkyl group of the alkyl(meth)acrylate-based unit has preferably 1 to 10 carbon atoms, and more preferably 1 to 4 carbon atoms.

Further, examples of a monomer unit capable of being copolymerized with the (meth)acrylate-based unit include a styrene-based unit, a maleic acid anhydride-based unit, a maleimide-based unit and the like. In this case, examples of the styrene-based unit include, but are not limited to, styrene, α-methylstyrene and the like; examples of the maleic acid anhydride-based monomer include, but are not limited to, maleic acid anhydride, methyl maleic acid anhydride, cyclohexyl maleic acid anhydride, phenyl maleic acid anhydride, and the like; and examples of the maleimide-based monomer include, but are not limited to, maleimide, N-methyl maleimide, N-cyclohexyl maleimide, N-phenyl maleimide and the like. These may be used either alone or in a mixture.

Meanwhile, the acrylic film may be a film including a (meth)acrylate-based resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open Nos. 2000-230016, 2001-151814, and 2002-120326, and the like.

The method of manufacturing the acrylic film is not particularly limited, and for example, the acrylic film may be manufactured by sufficiently mixing a (meth)acrylate-based resin, other polymers, an additive and the like by any appropriate mixing method to manufacture a thermoplastic resin composition, and then film-molding the resin composition, or may also be manufactured by preparing the (meth)acrylate-based resin, other polymers, an additive and the like in separate solutions, mixing the solutions to form a homogeneous mixture solution, and then film-molding the mixture solution. In addition, the acrylic film may be an unstretched film, or a stretched film. The stretched film may be a uniaxially stretched film or a biaxially stretched film, and the biaxially stretched film may be a simultaneous biaxially stretched film or a sequential biaxially stretched film.

Meanwhile, the polarizing plate of the present invention may further include a primer layer between the adhesive layer and the protective film in order to further enhance adhesive strength. In this case, the primer layer may be formed by a method of applying a coating solution including a water-dispersible polymer resin, a water-dispersible particulate and water on a protective film by using a bar coating method, a gravure coating method and the like, and drying the coating solution. The water-dispersible polymer resin may be, for example, a water-dispersible polyurethane-based resin, a water-dispersible acrylic resin, a water-dispersible polyester-based resin or a combination thereof, and the like, and for the water-dispersible particulate, it is possible to use an inorganic-based particulate such as silica, titania, alumina and zirconia, or an organic-based particulate composed of a silicone-based resin, a fluorine-based resin, a (meth)acrylic resin, a crosslinked polyvinyl alcohol and a melamine-based resin, or a combination thereof, but the particulate is not limited thereto.

Meanwhile, the polarizer and the protective film may be attached by a method of applying an adhesive on the surface of the polarizer or the protective film by using a roll coater, a gravure coater, a bar coater, a knife coater, or a capillary coater, and the like, and then heating and paper-laminating the polarizer or the protective film by a laminated paper roll, or laminating paper by compressing the polarizer and the protective film at normal temperature, a method of irradiating UV after the paper-lamination, or the like. Meanwhile, as the adhesive, various adhesives for a polarizing plate used in the art, for example, a polyvinyl alcohol-based adhesive, a polyurethane-based adhesive, an acrylic adhesive, a cationic or radical adhesive and the like may be used without limitation.

1-4. Adhesion Layer

Meanwhile, the polarizing plate of the present invention may include an adhesion layer at the upper portion of the protective layer, if necessary, for attachment to an optical film such as a display device panel or a phase difference film.

In this case, the adhesion layer may be formed by using various gluing agents well known in the art, and the kind thereof is not particularly limited. For example, the adhesion layer may be formed by using a rubber-based gluing agent, an acrylic gluing agent, a silicone-based gluing agent, a urethane-based gluing agent, a polyvinyl alcohol-based gluing agent, a polyvinyl pyrrolidone-based gluing agent, a polyacryl amide-based gluing agent, a cellulose-based gluing agent, a vinyl alkyl ether-based gluing agent and the like. Among them, it is particularly preferred that an acrylic film is used in consideration of transparency, heat resistance and the like.

Meanwhile, the adhesion layer may be formed by a method of applying a gluing agent at the upper portion of the protective layer, and may also be formed by a method of attaching an adhesion sheet, which is manufactured by applying a gluing agent on a release sheet, and then drying the gluing agent, at the upper portion of the protective layer.

2. Image Display Device

The aforementioned polarizing plate of the present invention may be usefully applied to an image display device such as a liquid crystal display device. The image display device may be, for example, a liquid crystal display device including a liquid crystal panel and polarizing plates each provided on both surfaces of the liquid crystal panel, and in this case, at least one of the polarizing plates may be the polarizing plate according to the present invention. In this case, the kind of liquid crystal panel included in the liquid crystal display device is not particularly limited. For example, it is possible to apply all the publicly known panels such as a passive matrix type panel such as a twisted nematic (TN)-type, a super twisted nematic (STN)-type, a ferroelectric (F)-type, or a polymer dispersed (PD)-type; an active matrix type panel such as a two terminal or three terminal; an in plane switching (IPS) panel and a vertical alignment (VA) panel without being limited to the kind thereof. Furthermore, the kinds of other configurations which constitute the liquid crystal display device, for example, the kinds of upper and lower substrates (e.g., a color filter substrate, or an array substrate) and the like are not particularly limited, and the configuration publicly known in the field may be adopted without limitation.

BEST MODE

Hereinafter, the present invention will be described in more detail with reference to specific Examples.

Preparation Example 1

Manufacture of Acrylic Protective Film

A raw material pellet was manufactured by supplying a resin composition, in which poly(N-cyclohexylmaleimide-co-methylmethacrylate), a styrene-maleic acid anhydride copolymer resin and a phenoxy-based resin were uniformly mixed with each other at a weight ratio of 100:2.5:5, to a 24Φ extruder in which a portion from a raw material hopper to the extruder was substituted with nitrogen, and melting the mixed resin composition at 250° C.

PKFE (Mw=60,000, Mn=16,000, Tg=95° C.) manufactured by InChemRez® Co., Ltd., was used as the phenoxy-based resin, Dylaeck 332 with a content of 85 wt % of styrene and 15 wt % of anhydrous maleic acid anhydride was used as the styrene-maleic acid anhydride copolymer resin, and as the poly(N-cyclohexylmaleimide-co-methylmethacrylate) resin, a resin with a content of 6.5 wt % of N-cyclohexylmaleimide as a result of NMR analysis was used.

The obtained raw material pellet was dried under vacuum, melted by the extruder at 260° C., allowed to pass through a coat hanger-type T-die, and allowed to pass through a chrome plating casting roll and a drying roll and the like to manufacture a film having a thickness of 150 μm. A pilot stretching device was used to stretch the film at a ratio of 170% in the MD direction at 125° C. by using the difference between speeds of the rolls, thereby manufacturing an acrylic film.

After the acrylic film manufactured by the aforementioned process was subjected to corona treatment, a primer composition, in which 20 parts by weight of an oxazoline crosslinking agent (Nippon Shokubai Co., Ltd., WS700) was added to a primer composition with a solid content of 10 wt % that is prepared by diluting CK-PUD-F (Chokwang urethane dispersion) with pure water, was coated on one surface of the acrylic film with a #7 bar, and then the acrylic film was stretched at a ratio of 190% in a TD direction at 130° C. using a tenter, thereby finally manufacturing an acrylic protective film having a primer layer thickness of 400 nm.

Preparation Example 2

Preparation of Radical Curable Composition (1) Radical Curable Composition A

Radical curable composition A was prepared by mixing 3 parts by weight of a radical initiator Irgacure-819 (manufactured by Ciba Specialty Chemicals Co., Ltd.) with 100 parts by weight of a resin composition prepared by mixing 50 parts by weight of 2-hydroxyethylacrylate with 50 parts by weight of a compound represented by the following [Formula 11].

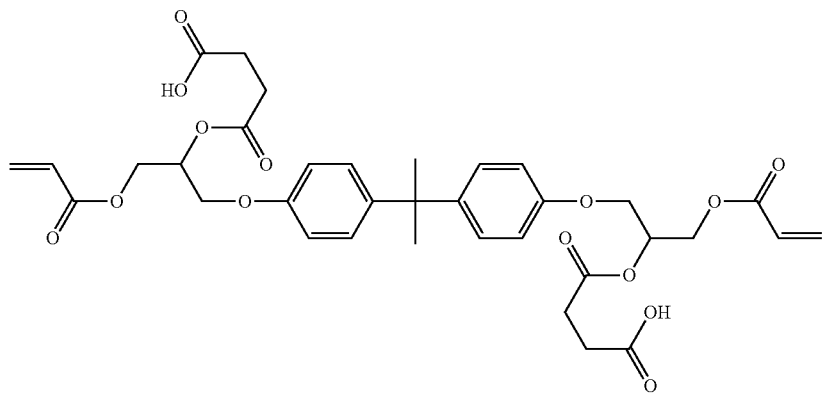

[Formula 11]

(2) Radical Curable Composition B

Radical curable composition B was prepared by mixing 3 parts by weight of a radical initiator Irgacure-819 (manufactured by Ciba Specialty Chemicals Co., Ltd.) with 100 parts by weight of a resin composition prepared by mixing 50 parts by weight of 2-hydroxyethylacrylate with 50 parts by weight of a compound represented by the following [Formula 12].

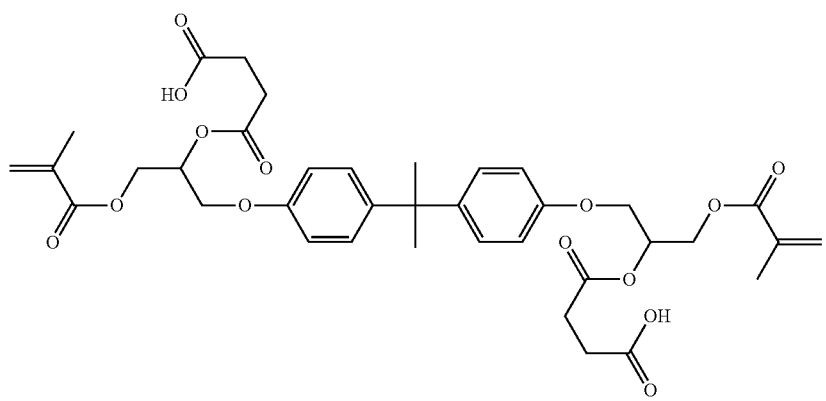

[Formula 12]

(3) Radical Curable Composition C

Radical curable composition C was prepared by mixing 3 parts by weight of a radical initiator Irgacure-819 (manufactured by Ciba Specialty Chemicals Co., Ltd.) with 100 parts by weight of a resin composition prepared by mixing 50 parts by weight of 2-hydroxyethylacrylate with 50 parts by weight of acrylomorpholine.

(4) Radical Curable Composition D

Radical curable composition D was prepared by mixing 3 parts by weight of a radical initiator Irgacure-819 (manufactured by Ciba Specialty Chemicals Co., Ltd.) with 100 parts by weight of a resin composition prepared by mixing 50 parts by weight of 2-hydroxyethylacrylate with 50 parts by weight of dipropyleneglycol diacrylate.

(5) Radical Curable Composition E

Radical curable composition E was prepared by mixing 3 parts by weight of a radical initiator Irgacure-819 (manufactured by Ciba Specialty Chemicals Co., Ltd.) with 100 parts by weight of a resin composition prepared by mixing 50 parts by weight of 2-hydroxyethylacrylate with 50 parts by weight of acrylic acid.

(6) Radical Curable Composition F

Radical curable composition F was prepared by mixing 3 parts by weight of a radical initiator Irgacure-819 (manufactured by Ciba Specialty Chemicals Co., Ltd.) with 100 parts by weight of a resin composition prepared by mixing 50 parts by weight of 2-hydroxyethylacrylate with 50 parts by weight of a compound represented by the following [Formula 13].

[Formula 13]

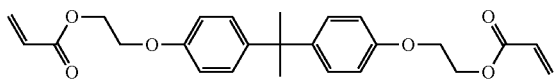

Example 1

Radical curable composition A was applied on a primer layer of an acrylic film-based protective film prepared in Preparation Example 1 by using a dropper, and lamination was performed on one surface of a polarizer (PVA device), a condition was set such that the thickness of the final adhesive layer became 1 to 2 μm, and then the film was allowed to pass through a laminator (5 m/min). Then, a polarizing plate including a protective film on one surface of a polarizer was manufactured by irradiating UV light with 900 mJ/cm$^2$ on a surface, on which the acrylic film was laminated, using a UV irradiation device (fusion lamp, D bulb).

Next, Radical curable composition A was applied on the other surface of the side of the PVA device of the polarizing plate manufactured on which the protective film was laminated, a PET film having a release force was laminated, a condition was set such that the thickness of the final protective layer became 5 to 6 μm, and then the film was allowed to pass through a laminator (5 m/min). Then, a polarizing plate including a protective film on one surface of a polarizer and a protective layer on the other surface thereof was manufactured by irradiating UV light with 900 mJ/cm$^2$ on a surface, on which a release PET film was laminated, using a UV irradiation device (fusion lamp, D bulb), and removing the PET film. The polarizing plate was manufactured under an environment at a temperature of 20° C. and a humidity less than 30%.

Example 2

A polarizing plate was manufactured in the same manner as in Example 1, except that Radical Curable Composition B was used instead of Radical Curable Composition A.

Comparative Example 1

A polarizing plate was manufactured in the same manner as in Example 1, except that Radical Curable Composition C was used instead of Radical Curable Composition A.

Comparative Example 2

A polarizing plate was manufactured in the same manner as in Example 1, except that Radical Curable Composition D was used instead of Radical Curable Composition A.

Comparative Example 3

A polarizing plate was manufactured in the same manner as in Example 1, except that Radical Curable Composition E was used instead of Radical Curable Composition A.

Comparative Example 4

A polarizing plate was manufactured in the same manner as in Example 1, except that Radical Curable Composition F was used instead of Radical Curable Composition A.

Further, the following experiment was performed in order to measure the adhesion, thermal impact stability, glass transition temperature, water resistance and the like of the protective layers of the polarizing plates manufactured in Examples 1 and 2 and Comparative Examples 1 to 4. The results are shown in the following [Table 1].

1. Evaluation of adhesion: The radical curable compositions used in the Examples and the Comparative Examples were applied on a polarizer (PVA device), a polarizer (PVA device) was laminated thereon to allow the resulting film to pass through a laminator, and UV light with 900 mJ/cm$^2$ was irradiated thereon by using a UV irradiation device (fusion lamp, D bulb) to manufacture a peel strength sample composed of the polarizer/the protective layer/the polarizer. The manufactured sample was cut into a width of 20 mm and a length of 100 mm, and then a peel strength was measured during the peeling-off at a speed of 300 mm/min and an angle of 90 degrees by using a Texture Analyzer apparatus (TA-XT Plus manufactured by Stable Micro System Co.), and the cases in which the peel strength was more than 1 N/cm, 0.5 N/cm to 1.0 N/cm, and less than 0.5 N/cm were indicated as excellent, good, and bad, respectively.

2. Evaluation of Water Resistance: The polarizing plates in the Examples and the Comparative Examples were laminated on a glass substrate, and then immersed in a thermostat at 60° C. The water resistance was judged by observing whether the end portions of the polarizing plate had been discolored after 24 hours, and the cases in which no change was observed and discoloration occurred were indicated as excellent and bad, respectively.

3. Evaluation of Thermal Impact Properties: The evaluation was performed by repeating 100 times a process of laminating the polarizing plates manufactured in the Examples and the Comparative Examples on a glass substrate, leaving the laminates to stand at −40° C. for 30 minutes, and then leaving the laminates to stand again at 80° C. for 30 minutes. Then, it was visually evaluated whether the external appearance of the polarizing plate changed. The cases, in which cracks with a size of 2 mm or less were generated only at the end portions, cracks with a short line shape of 5 mm or more were only confirmed at the portions other than the end portions, and a plurality of cracks was generated on the entire surface of the polarizing plate in the external appearance of the polarizing plate, were indicated as excellent, good, and bad, respectively.

4. Measurement of Glass Transition Temperature: The protective layers of the polarizing plates in the Examples and the Comparative Examples, which were manufactured under the aforementioned curing conditions, were separated, and then the temperature was increased to −30 to 200° C. to measure the glass transition temperature at a second run by using a differential scanning calorimeter (manufactured by DSC Mettler Inc.).

TABLE 1

| Classification | Composition | Thickness of protective layer [μm] | Adhesion | Water resistance | Tg (° C.) | Thermal impact stability | Miscellaneous |
| --- | --- | --- | --- | --- | --- | --- | --- |
| Example 1 | A | 5 | Excellent | Excellent | 61 | Excellent | — |
| Example 2 | B | 5 | Excellent | Excellent | 68 | Good | — |
| Comparative Example 1 | C | 5 | Good | Bad | 63 | Good | — |

TABLE 1-continued

| Classification | Composition | Thickness of protective layer [μm] | Adhesion | Water resistance | Tg (° C.) | Thermal impact stability | Miscellaneous |
|---|---|---|---|---|---|---|---|
| Comparative Example 2 | D | 5 | Bad | Excellent | 46 | Bad | — |
| Comparative Example 3 | E | 5 | Excellent | Bad | 80 | Excellent | Acid odor |
| Comparative Example 4 | F | 5 | Bad | Excellent | 60 | Good | — |

As can be seen in Table 1, it can be known that in the case of Examples 1 and 2 including both the first compound and the second compound of the present invention, adhesion was excellent, water resistance was excellent, the glass transition temperature was high, and thermal impact stability was excellent.

However, it can be known that in the case of Comparative Example 1, acrylomorpholine could be added to have a relatively high glass transition temperature, but water resistance was reduced.

Further, it can be known that in the case of Comparative Example 2, dipropyleneglycol diacrylate could be added to improve water resistance, but adhesion was very poor, the glass transition temperature was low, and thermal impact stability was not good.

In addition, it can be known that in the case of Comparative Example 3, acrylic acid could be added to have a high glass transition temperature and the like, but water resistance was reduced, and strong acid odor was generated from the polarizing plate.

Furthermore, it can be known that in the case of Comparative Example 4, a bisphenol-type acrylic compound including no carboxy group as the second compound was added, and as the humidity was increased, adhesive strength was decreased.

Meanwhile, in the case of the Examples, the adhesive layer and the protective layer were manufactured by using the same radical curable composition for convenience when the polarizing plate was manufactured, but the present invention is not limited thereto.

As described above, exemplary embodiments of the present invention have been described in detail, but it will be obvious to a person with ordinary skill in the art that the scope of the present invention is not limited thereto, and various modifications and changes may be made without departing from the technical spirit of the present invention described in the claims.

The invention claimed is:

1. A polarizing plate comprising:
   a polarizer; and
   a protective layer formed on at least one surface of the polarizer,
   wherein the protective layer is a cured product of a radical curable composition comprising (A) a first compound represented by Formula I, (B) a radical curable second compound having two or more of each of a benzene ring, a (meth)acryloyl group, and a carboxyl group in a molecule thereof, and (C) a radical initiator:

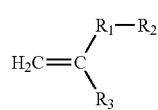

[Formula I]

wherein $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

2. The polarizing plate of claim 1, wherein the second compound is a compound represented by Formula II:

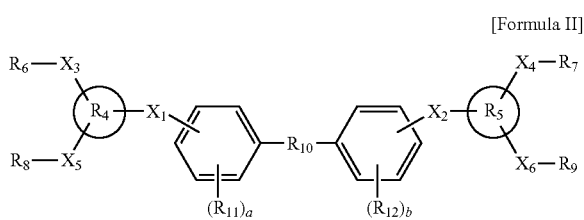

[Formula II]

wherein $R_4$ and $R_5$ are each independently a $C_{1\sim10}$ aliphatic chain, a $C_{4\sim14}$ aliphatic ring, a $C_{6\sim14}$ aromatic ring, or a combination thereof; $R_6$ and $R_7$ are each independently a $C_{1\sim14}$ alkyl group, a $C_{4\sim14}$ cycloalkyl group, a $C_{6\sim14}$ aryl group, or a combination thereof, and in this case, $R_6$ and $R_7$ each independently has at least one carboxyl substituent in a molecule thereof; $R_8$ and $R_9$ are each independently an acryloyl group or a methacryloyl group; $R_{10}$ is a single bond, or a $C_{1\sim10}$ alkylene group; $R_{11}$ and $R_{12}$ are each independently a halogen atom, or a $C_{1\sim10}$ alkyl group; a and b are each independently an integer of 0 to 2; $X_1$ and $X_2$ are each independently a single bond, or —O—; $X_3$ and $X_4$ are each independently a single bond, —O—, —CO—, —COO—, or —OCO—; and $X_5$ and $X_6$ are each independently a single bond or —O—.

3. The polarizing plate of claim 1, wherein the radical curable composition comprises 10 to 80 parts by weight of the first compound, 1 to 80 parts by weight of the second compound and 0.5 to 10 parts by weight of the radical initiator, based on 100 parts by weight of the radical curable composition.

4. The polarizing plate of claim 1, wherein the first compound is one or more selected from the group consisting of compounds represented by Formula 1 to Formula 10:

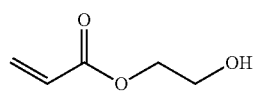

[Formula 1]

[Formula 2]
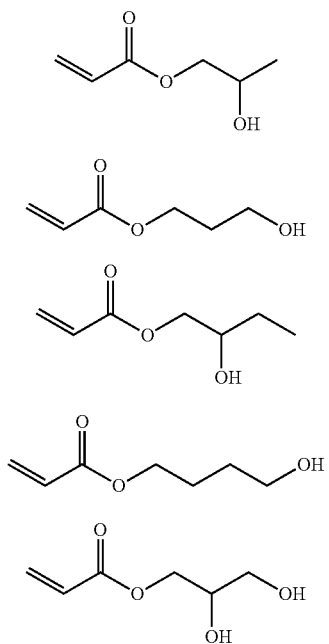
[Formula 3]
[Formula 4]
[Formula 5]
[Formula 6]
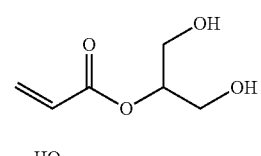
[Formula 7]
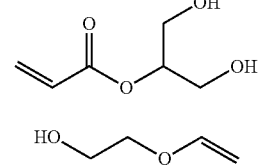
[Formula 8]
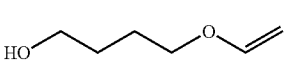
[Formula 9]
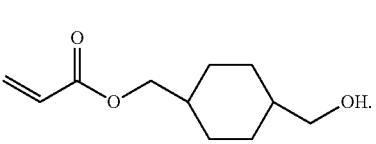
[Formula 10]
5. The polarizing plate of claim 1, wherein the second compound is one or more selected from the group consisting of compounds represented by the Formula 11 and Formula 12:
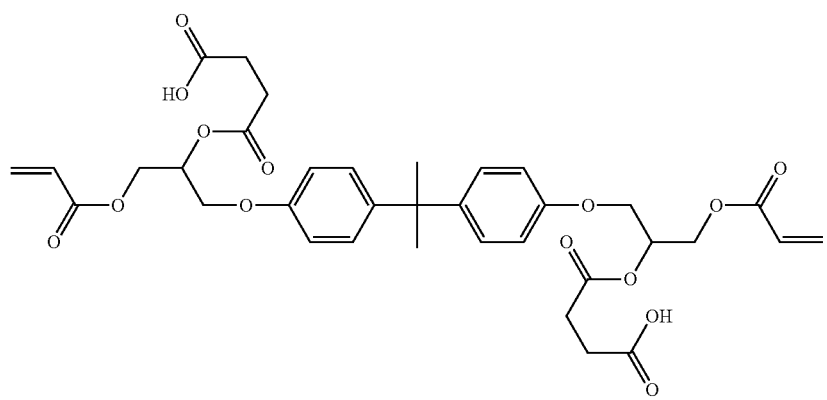
[Formula 11]
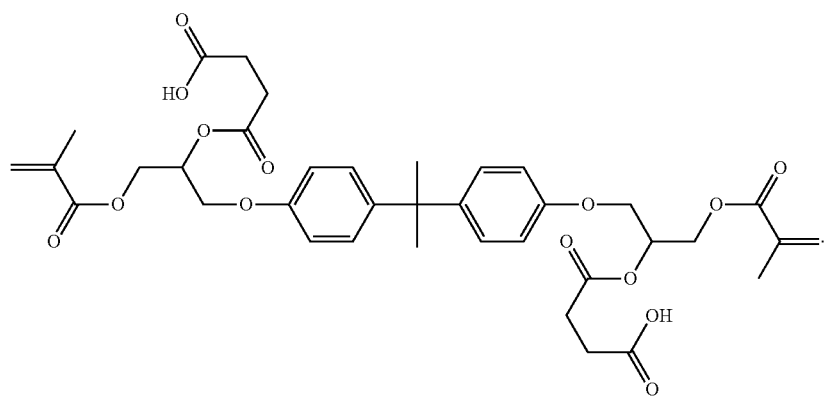
[Formula 12]

6. The polarizing plate of claim 1, wherein the second compound has an acid value of 50 to 300 mg KOH/g.

7. The polarizing plate of claim 1, wherein the radical curable composition further comprises a photoacid generator.

8. The polarizing plate of claim 1, wherein the radical curable composition after curing has a glass transition temperature of 60° C. or more.

9. The polarizing plate of claim 1, wherein the protective layer has a thickness of 0.5 to 20 μm.

10. The polarizing plate of claim 1, wherein a protective film is attached to a surface opposite to a surface of the polarizer, on which the protective layer is formed, through an adhesive layer.

11. The polarizing plate of claim 1, further comprising:
an adhesion layer at an upper portion of the protective layer.

12. The polarizing plate of claim 1, wherein the polarizer is a polyvinyl alcohol-based film comprising iodine or a dichroic dye.

13. An image display device comprising the polarizing plate of claim 1.

14. An image display device comprising the polarizing plate of claim 2.

15. An image display device comprising the polarizing plate of claim 3.

16. An image display device comprising the polarizing plate of claim 4.

17. An image display device comprising the polarizing plate of claim 5.

18. An image display device comprising the polarizing plate of claim 6.

19. An image display device comprising the polarizing plate of claim 7.

20. An image display device comprising the polarizing plate of claim 8.

* * * * *